(12) United States Patent
Teague

(10) Patent No.: US 12,148,313 B2
(45) Date of Patent: Nov. 19, 2024

(54) MIXED ASPECT GRAPHIC FOR NEIGHBORING FIELDS OF VIEW

(71) Applicant: Rockwell Collins, Inc., Cedar Rapids, IA (US)

(72) Inventor: Jacob G. Teague, West Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 19 days.

(21) Appl. No.: 17/083,778

(22) Filed: Oct. 29, 2020

(65) Prior Publication Data

US 2022/0139235 A1 May 5, 2022

(51) Int. Cl.
| | |
|---|---|
| *G01S 7/10* | (2006.01) |
| *B64D 43/00* | (2006.01) |
| *G01S 7/04* | (2006.01) |
| *G01S 13/89* | (2006.01) |
| *G01S 13/95* | (2006.01) |
| *G08G 5/00* | (2006.01) |

(52) U.S. Cl.
CPC ........... *G08G 5/0047* (2013.01); *B64D 43/00* (2013.01)

(58) Field of Classification Search
None
See application file for complete search history.

(56) References Cited

U.S. PATENT DOCUMENTS

| | | | |
|---|---|---|---|
| 5,337,057 A * | 8/1994 | Michie | G01S 7/12 342/186 |
| 5,493,309 A | 2/1996 | Bjornholt | |
| 5,978,715 A | 11/1999 | Briffe et al. | |
| 6,473,003 B2 * | 10/2002 | Horvath | G08G 5/0078 340/961 |
| 7,027,898 B1 | 4/2006 | Leger et al. | |
| 7,039,505 B1 * | 5/2006 | Southard | H04N 19/186 701/3 |
| 7,414,543 B2 | 8/2008 | Rye et al. | |
| 7,696,920 B1 * | 4/2010 | Finley | G01S 7/062 342/26 B |

(Continued)

FOREIGN PATENT DOCUMENTS

| | | |
|---|---|---|
| CN | 110426709 A | 11/2019 |
| EP | 2221583 A2 | 8/2010 |
| EP | 3128338 A1 | 2/2017 |

OTHER PUBLICATIONS

Extended Search Report in European Application No. 21204714.6 dated Mar. 25, 2022, 7 pages.

(Continued)

*Primary Examiner* — Adam D Tissot
*Assistant Examiner* — Michael T Silva
(74) *Attorney, Agent, or Firm* — Suiter Swantz IP

(57) ABSTRACT

A system and method for rendering near range weather information in a first aspect and mid-to-long range weather information in a second aspect includes transforming the mid-to-long range weather information to preserve certain relationships between the near range rendering and the mid-to-long range rendering while compressing distances to fit both renderings on a single display. Criticality metrics are maintained for the compressed mid-to-long range rendering by identifying the most critical weather indicator and applying it to the compressed weather cell rendering.

8 Claims, 5 Drawing Sheets

(56) References Cited

U.S. PATENT DOCUMENTS

| | | |
|---|---|---|
| 8,395,541 B2 | 3/2013 | Khatwa et al. |
| 8,643,508 B2 | 2/2014 | Turner |
| 9,134,418 B1 * | 9/2015 | Kronfeld ................ G01S 7/412 |
| 9,201,136 B2 | 12/2015 | Khatwa et al. |
| 9,234,982 B2 | 1/2016 | Ramaiah et al. |
| 9,244,167 B1 | 1/2016 | Oransky et al. |
| 9,411,044 B1 | 8/2016 | Sperling et al. |
| 9,523,580 B2 | 12/2016 | Mohideen et al. |
| 9,649,935 B2 | 5/2017 | Gago et al. |
| 10,247,821 B1 | 4/2019 | Stover et al. |
| 10,473,484 B1 | 11/2019 | Goldstein |
| 10,539,654 B1 | 1/2020 | Weichbrod |
| 10,685,469 B1 | 6/2020 | Finley et al. |
| 2009/0177343 A1 | 7/2009 | Bunch et al. |
| 2009/0319103 A1 | 12/2009 | Dwyer et al. |
| 2009/0319944 A1 | 12/2009 | Chikkegowda et al. |
| 2010/0211237 A1 | 8/2010 | Nichols et al. |
| 2011/0010082 A1 | 1/2011 | Wilson et al. |
| 2012/0010765 A1 | 1/2012 | Wilson et al. |
| 2012/0274504 A1 * | 11/2012 | Kubota ..................... G01S 7/22 345/592 |
| 2013/0286022 A1 * | 10/2013 | Kubota ..................... G01S 7/10 345/440 |
| 2015/0302622 A1 * | 10/2015 | Takechi ................ G01C 21/20 345/629 |
| 2016/0209214 A1 | 7/2016 | Vasek et al. |
| 2017/0038457 A1 | 2/2017 | Wang et al. |
| 2017/0082745 A1 * | 3/2017 | Kronfeld ............... G01S 13/953 |
| 2017/0186203 A1 | 6/2017 | Fournier et al. |
| 2020/0231298 A1 | 7/2020 | Bilek et al. |
| 2021/0009281 A1 | 1/2021 | He et al. |

OTHER PUBLICATIONS

Extended Search Report in European Application No. 21205618.8 dated Mar. 25, 2022, 7 pages.

* cited by examiner

MIXED ASPECT GRAPHIC FOR NEIGHBORING FIELDS OF VIEW

BACKGROUND

Horizontal weather displays limit a pilot's long-range visibility when display controls are set to close range. Those limitations may lead to costly flight plan deviations and/or putting the aircraft in a hazardous situation due to poor flight path planning as mid-to-long range weather cells are not visible. These risks are substantially increased in single pilot operations where a copilot is not available to monitor mid-to-long range information in parallel.

SUMMARY

In one aspect, embodiments of the inventive concepts disclosed herein are directed to a system and method for rendering near range weather information in a first aspect and mid-to-long range weather information in a second aspect. The mid-to-long range weather information is transformed to preserve certain relationships between the near range rendering and the mid-to-long range rendering while compressing distances to fit both renderings on a single display.

In a further aspect, criticality metrics are maintained for the compressed mid-to-long range rendering by identifying the most critical weather indicator and applying it to the compressed weather cell rendering.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
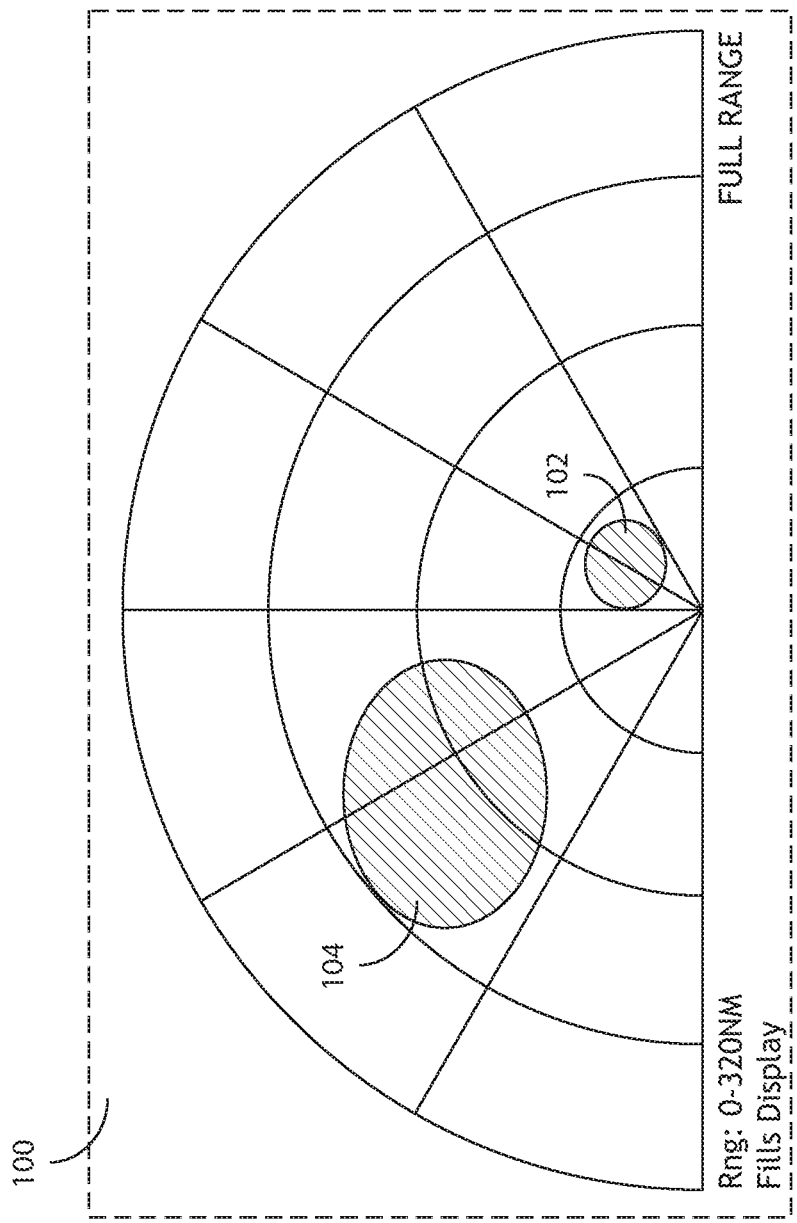
FIG. 1 shows a representation of a full range weather radar view.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for rendering near range weather information in a first aspect and mid-to-long range weather information in a second aspect. The mid-to-long range weather information is transformed to preserve certain relationships between the near range rendering and the mid-to-long range rendering while compressing distances to fit both renderings on a single display.

Figure 2:
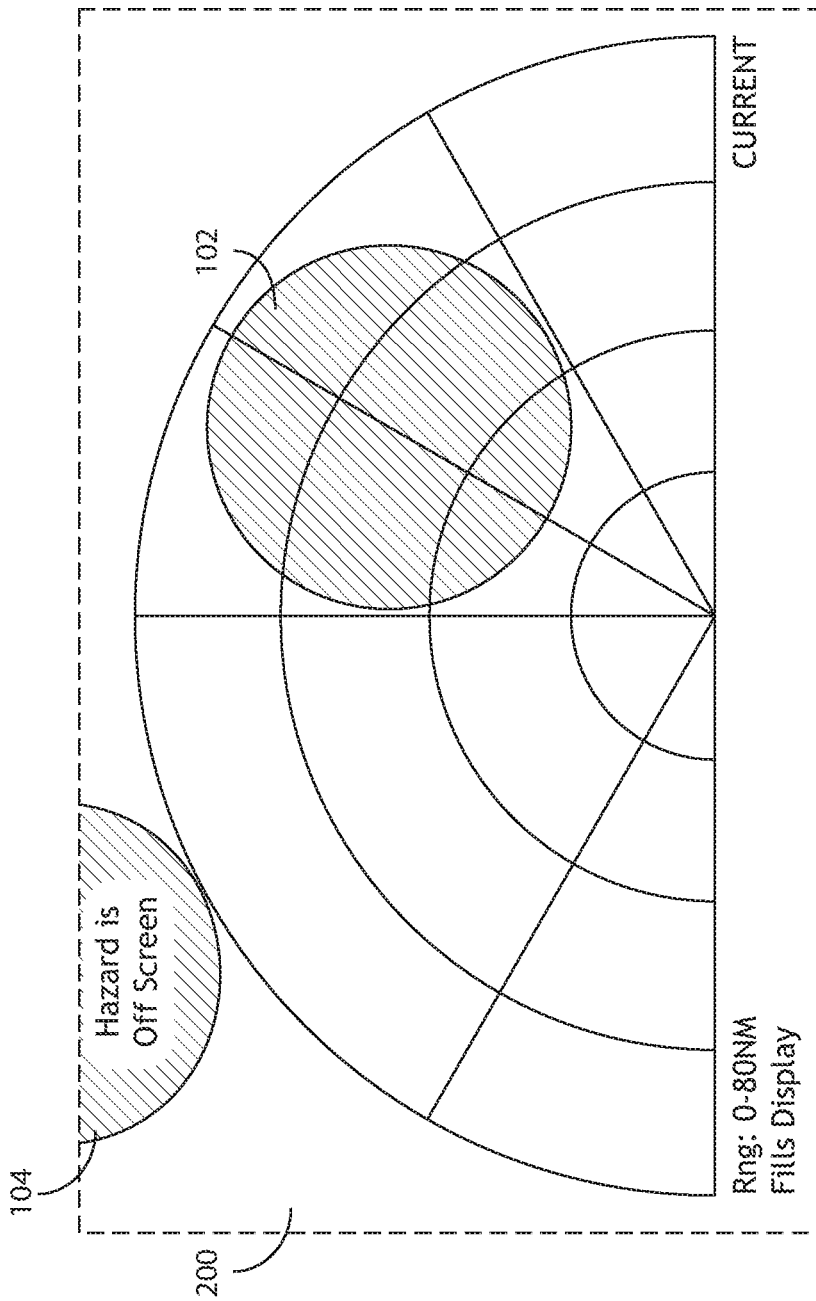
FIG. 2 shows a representation of a near range weather radar view.

Referring to FIGS. 1 and 2, representations of a full range weather radar view 100 and a near range weather radar view 200 are shown. When a weather radar display is a full range weather radar view 100, near range weather cells 102 and long range weather cells 104 are both fully rendered for long range flight path planning; however, the near range weather cells 102 may be reduced in scale such that they are insufficient for near term use. Conversely, when the weather radar display is a near range weather radar view 200, the near range weather cells 102 are rendered in detail for near term flight planning, but long range weather cells 104 may be only partially visible and therefore may be insufficient for long range flight planning.

Figure 3:
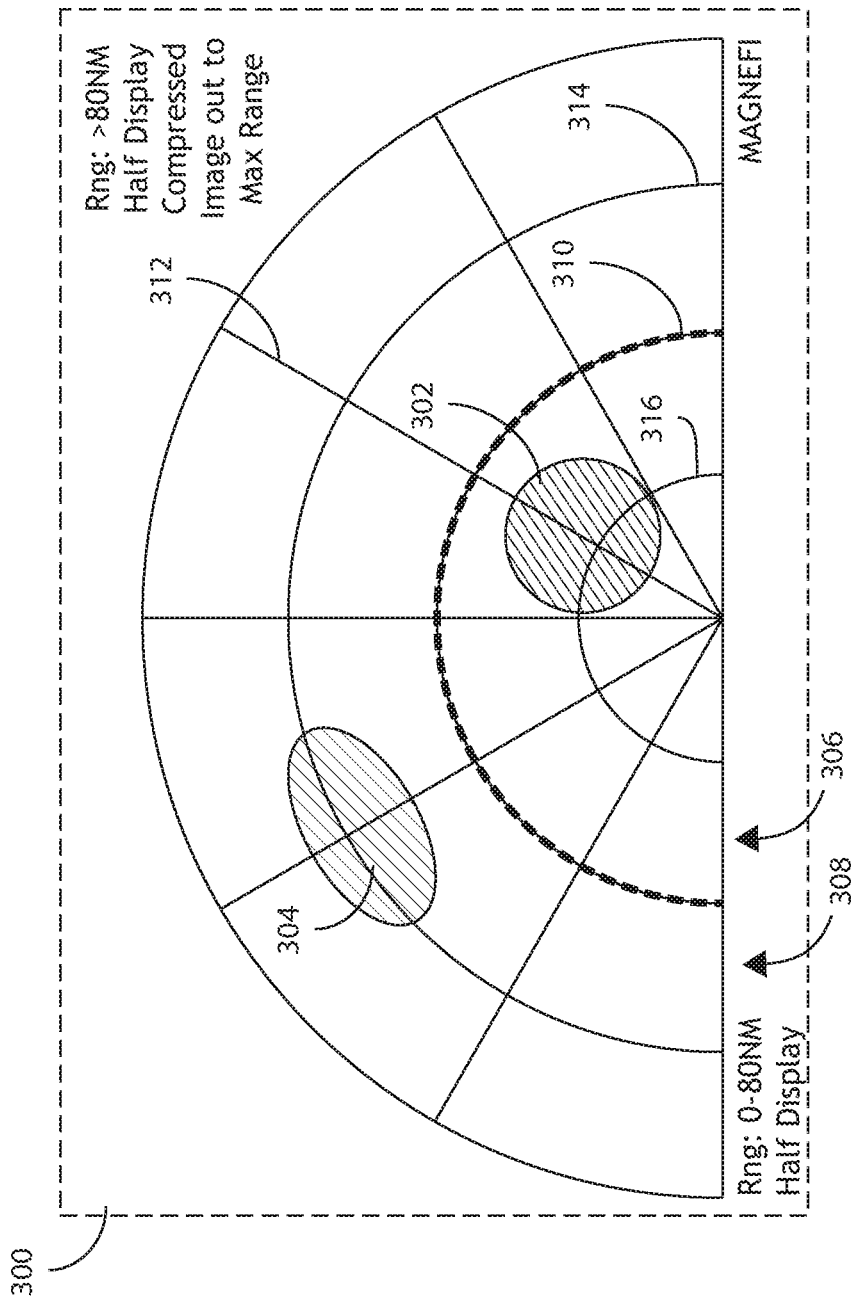
FIG. 3 shows a representation of a mixed aspect weather radar view according to an exemplary embodiment.

Referring to FIG. 3, a representation of a mixed aspect weather radar view 300 according to an exemplary embodiment is shown. The mixed aspect weather radar view 300 defines a near range weather radar portion 306 and a mid-to-long range weather radar portion 308. Near range weather cells 302, or any weather data points nearer than a defined threshold, are rendered in the near range weather radar portion 306 in a first aspect or scale. long range weather cells 304, or any weather data points further than the defined threshold, are rendered in the mid-to-long range weather radar portion 308 in a second aspect where angular distribution is maintained but distances are compressed.

In at least one embodiment, a boundary element 310 is rendered at a distance corresponding to the defined threshold so that the pilot may quickly determine what portions of the mixed aspect weather radar view 300 are the near range weather radar portions 306 and mid-to-long range weather radar portions 308. In at least one embodiment, a textual indicator may be rendered at the threshold distance in proximity to the boundary element 310 to indicate the threshold distance to the pilot. Furthermore, the mixed aspect weather radar view 300 may include a set equally spaced radial or angular markings 312 that indicate degrees in the range of view; such radial or angular markings 312 would be common to both the near range weather radar portion 306 and mid-to-long range weather radar portion 308. The mixed aspect weather radar view 300 may also include sets of distance markers 314, 316. A first set of distance markers 314 may be associated with the mid-to-long range weather radar portion 308 and are calibrated to the compressed distances of the mid-to-long range weather radar portion 308. Likewise, a second set of distance markers 316 may be associated with the near range weather radar portion 306 and are calibrated to the non-compressed distances of the near range weather radar portion 306. It may be appreciated that the distance markers 314, 316 may represent the same iterative distance change, but be rendered according to the different represented distances in the near range weather radar portion 306 and mid-to-long range weather radar portion 308 respectively.

In at least one embodiment, the mixed aspect weather radar view 300 may be scalable. In such embodiments, while scaling, the mid-to-long range weather radar portion 308 may be rendered with increasing distance compression as the near range weather radar portion 306 is scaled up, and decreasing distance compression as the near range weather radar portion 306 is scaled down. In each case, the distance markers 314, 316 may be scaled accordingly to correspond to changes in distances.

Figure 4:
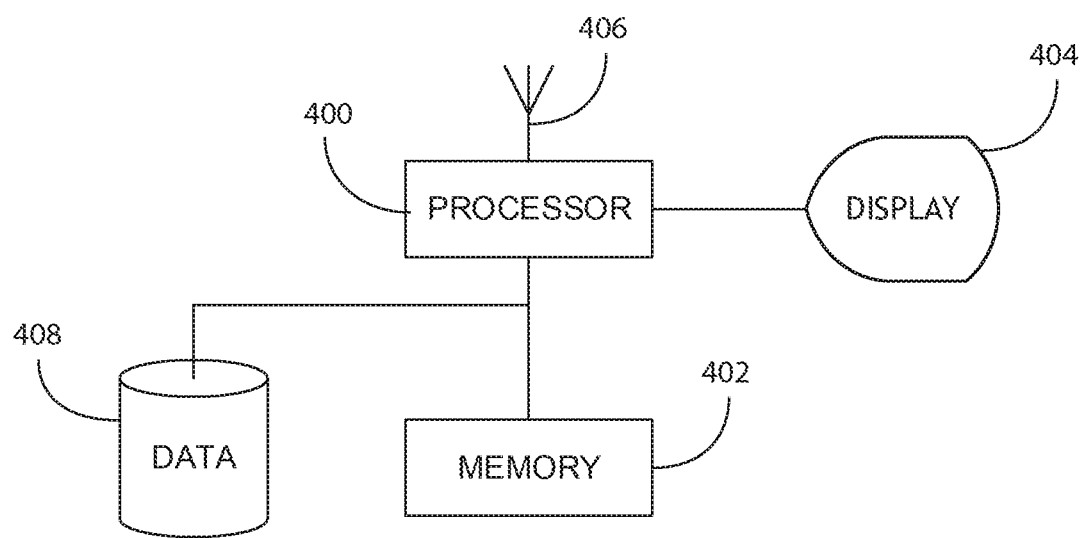
FIG. 4 shows a block diagram of a system suitable for implementing exemplary embodiments.

Referring to FIG. 4, a block diagram of a system suitable for implementing exemplary embodiments is shown. The system includes a processor 400, memory 402 connected to the processor 400 for storing processor executable code, and a display 404 for rendering weather information. In at least one embodiment, one or more avionics systems, such as a weather radar 406, may be connected to the processor 400 to provide weather data. In at least one embodiment, a data storage element 408 may be connected to the processor 400 for persistent storage of weather data.

The processor 400 is configured to receive weather related data for rendering on the display 404. The weather related data is divided into two or more range defined portions. The two or more range defined portions may be defined by corresponding distance thresholds; the distance thresholds may be predefined or dynamically adjustable. Weather related data within a near range distance threshold is rendered in a near range portion at a scale generally corresponding to a near range view for immediate flight planning. Weather related data beyond the near range distance threshold is rendered in a mid-to-long range portion wherein distances are compressed such that the entire range of the weather radar is rendered in a distance compressed form.

In at least one embodiment, the processor 400 renders one or more boundary elements corresponding to the threshold distances. Where the threshold distances are dynamically adjustable, the processor 400 may iteratively recompute weather data rendering for the near range portion and the mid-to-long range portion as the distance thresholds are adjusted.

In at least one embodiment, the processor 400 may dynamically adjust the scale of the near range portion. In such embodiments, the distance compression of the mid-to-long range portion may be increased or decreased to preserve the full range of weather data.

In at least one embodiment, each weather related datum may be associated with a criticality or severity metric. During distance compression, the compression algorithm may remove weather data as unrenderable at a certain scale; for example, beyond a certain compression threshold, the processor 400 may attempt to compress two pixels worth of data into a single pixel for rendering. The processor 400 may be configured to determine which pixel is associated with higher severity metric and retain the higher severity pixel for rendering.

Figure 5:
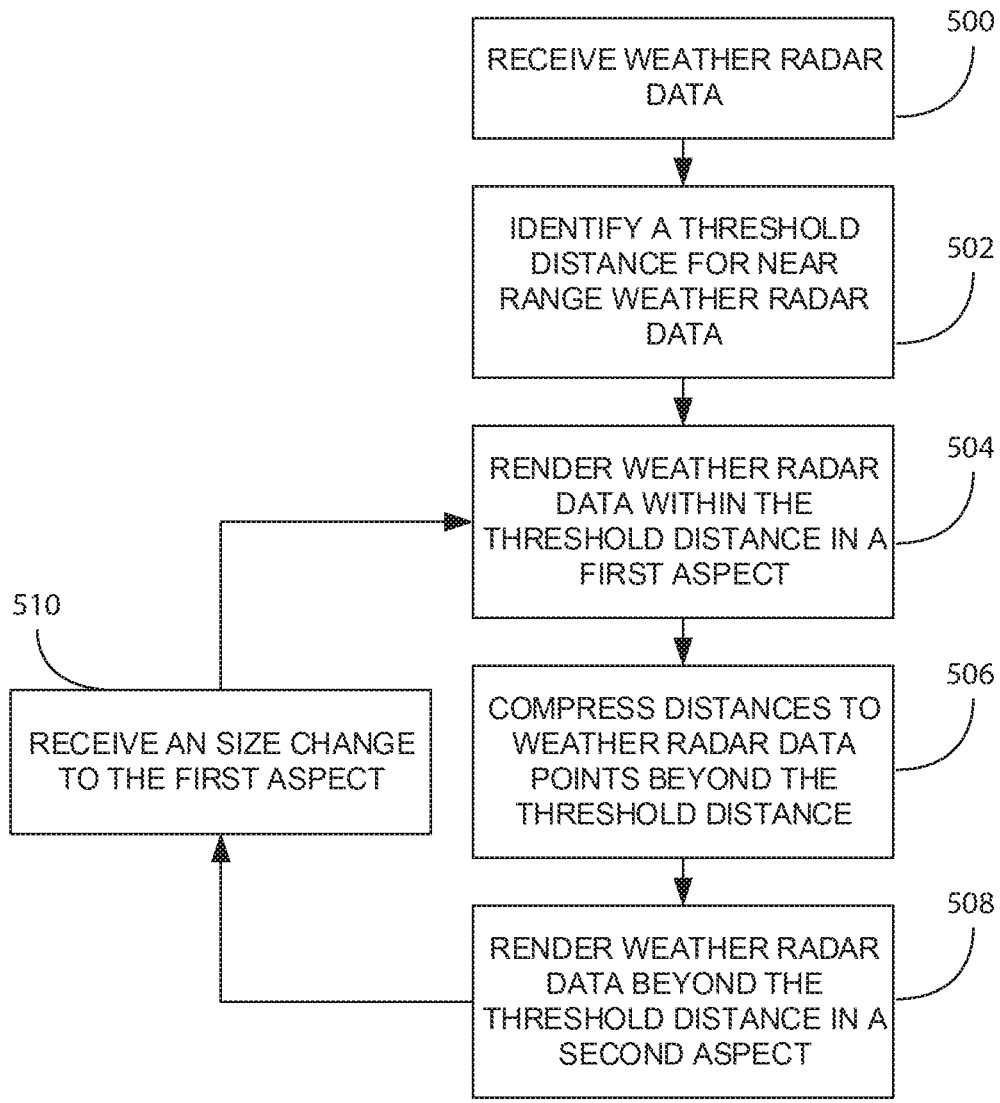
FIG. 5 shows a flowchart of a method for rendering weather radar data according to an exemplary embodiment.

Referring to FIG. 5, a flowchart of a method for rendering weather radar data according to an exemplary embodiment is shown. Weather radar data is received 500 from an avionics system or a communication system. A threshold distance is identified 502 or defined for a near range portion. Any weather radar data within the threshold distance is rendered 504 in the near range portion at a first scale. It may be appreciated that the threshold distance may be based on a distance from the radar source where the radar source is local to the platform; alternatively, where the weather radar data is remotely generated and communicated to platform, the threshold distance may be based on a computed location of the platform within the remotely generated data.

Weather radar data beyond the threshold distance, the distance to each data point is compressed 506 such that angular disposition is preserved, and relative radial disposition is preserved (points that are further away are rendered further away), but spacing is compressed so that the entire range beyond the threshold distance is rendered 508 in a mid-to-long range portion of the same display. The near range portion and mid-to-long range portion are rendered 504, 508 concentrically such that radial or angular rays are properly aligned.

In at least one embodiment, when an instruction to scale the near range portion is received 510, a new compression metric is identified to retain the full range of weather radar data by further compressing distances in the mid-to-long range portion.

In at least one embodiment, a severity or criticality metric for each weather related datum is identified and the most severe metrics are preserved and rendered for the applicable weather cell.

Embodiments of the present disclosure improve situational awareness by displaying both near and far ranges on a single display through two contiguous fields of view. Furthermore, embodiments provide a method to show all relevant information without hardware updates to existing displays.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form hereinbefore described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method comprising:
   receiving weather related data from a remote source;
   defining a near range portion of a rendering area corresponding to an area within a threshold distance centered on a computed location of a mobile platform separate from the remote source;
   defining a mid-to-long range portion of the rendering area corresponding to an area beyond the threshold distance centered on the computed location;
   identifying weather related data associated with a distance within the threshold distance;
   rendering the weather related data within the threshold distance in the near range portion at a first scale;
   identifying weather related data associated with a distance beyond the threshold distance;
   compressing a distance from a center point for each the weather related data beyond the threshold distance;
   rendering the distance compressed weather related data beyond the threshold distance in the mid-to-long range portion;
   rendering a boundary element between the near range portion and the mid-to-long range portion;
   rendering a first set of distance markers in the near range portion;
   rendering a second set of distance markers in the mid-to-far range portion;
   identifying a severity metric associated with each weather related datum beyond the threshold distance;
   determining a highest severity metric;
   determining a pixel associated with highest severity metric;
   retaining the pixel for rendering;
   receiving an instruction to change the first scale;
   rendering the near range portion at a second scale;
   re-compressing the distance from the center point for each the weather related data beyond the threshold distance based on the second scale;
   re-rendering the distance compressed weather related data beyond the threshold distance in the mid-to-long range portion;
   re-rendering the first set of distance markers and the second set of distance markers scaled to the change in the first scale,
   wherein:
      the near range portion and mid-to-long range portion are rendered to preserve a radial orientation for each weather related datum;
      the first set of distance markers and second set of distance markers represent a same relative distance; and
      the mid-to-long range portion is rendered with increasing distance compression as the near range portion is scaled up, and decreasing distance compression as the near range radar portion is scaled down.

2. The method of claim 1, further comprising rendering a textual indicator of the threshold distance in proximity to the boundary element.

3. The method of claim 1, further comprising rendering a plurality of radial markers continuously across both the near range portion and mid-to-long range portion.

4. The method of claim 1, further comprising:
   receiving an instruction to change the threshold distance to a new threshold distance;
   re-identifying weather related data associated with a distance within the new threshold distance;
   re-rendering the weather related data within the new threshold distance in the near range portion at the first scale;
   re-identifying weather related data associated with a distance beyond the new threshold distance;
   compressing the distance from a center point for each the weather related data beyond the new threshold distance; and
   re-rendering the distance compressed weather related data beyond the threshold distance in the mid-to-long range portion.

5. A system comprising:
   a display; and
   at least one processor in data communication with the display and a memory storing processor executable code for configuring the at least one processor to:
      receive weather related data from a remote source;
      define a near range portion of display corresponding to an area within a threshold distance centered on a computed location of a mobile platform separate from the remote source;
      define a mid-to-long range portion of the display corresponding to an area beyond the threshold distance centered on the computed location;
      identify weather related data associated with a distance within the threshold distance;
      render the weather related data within the threshold distance in the near range portion at a first scale;
      identify weather related data associated with a distance beyond the threshold distance;
      compress a distance from a center point for each the weather related data beyond the threshold distance;
      render the distance compressed weather related data beyond the threshold distance in the mid-to-long range portion;
      render a boundary element between the near range portion and the mid-to-long range portion;
      render a first set of distance markers in the near range portion;
      render a second set of distance markers in the mid-to-far range portion;
      receiving an instruction to change the first scale;
      rendering the near range portion at a second scale;
      determining a compression metric for the mid-to-long range portion based on the second scale to maintain all weather related data on the display;
      re-compressing the distance from the center point for each the weather related data beyond the threshold distance according to the compression metric;
      re-rendering the distance compressed weather related data beyond the threshold distance in the mid-to-long range portion; and re-rendering the first set of distance markers and the second set of distance markers scaled to the change in the first scale, wherein:
    the near range portion and mid-to-long range portion are rendered to preserve a radial orientation for each weather related datum;
    the first set of distance markers and second set of distance markers represent a same relative distance; and
    the mid-to-long range portion is rendered with increasing distance compression as the near range portion is scaled up, and decreasing distance compression as the near range radar portion is scaled down.

6. The system of claim 5, wherein the at least one processor is further configured to:

identify a severity metric associated with each weather related datum beyond the threshold distance;
    determine a highest severity metric;
    determine a pixel associated with highest severity metric; and
    retain the pixel for rendering when compressing the distance from the center point for each the weather related data beyond the threshold distance.

7. The system of claim 5, wherein the at least one processor is further configured to render a textual indicator of the threshold distance in proximity to the boundary element.

8. The system of claim 5, wherein the at least one processor is further configured to render a plurality of radial markers continuously across both the near range portion and mid-to-long range portion.

* * * * *